United States Patent [19]

Herzog et al.

[11] Patent Number: 4,669,903

[45] Date of Patent: Jun. 2, 1987

[54] BIO-MECHANICAL KEYBOARD STRUCTURE AND METHOD

[76] Inventors: Stuart Herzog; Barbara Herzog, both of 1433 E. Broadway, Tucson, Ariz. 85719

[21] Appl. No.: 726,402

[22] Filed: Apr. 23, 1985

[51] Int. Cl.⁴ .............................................. B41J 5/10
[52] U.S. Cl. ..................................... 400/489; 400/486
[58] Field of Search ............... 400/472, 486, 487, 488, 400/489, 682; 340/365 R, 365 VL, 365 S, 365 C, 365 L, 365 P, 365 A, 365 E; 434/227, 228, 229, 230, 231, 232, 233

[56] References Cited

U.S. PATENT DOCUMENTS

| | | | |
|---|---|---|---|
| 663,405 | 12/1900 | Allen | 400/486 |
| 1,267,356 | 5/1918 | Barr | 400/486 X |
| 1,652,464 | 12/1927 | Tyberg | 400/489 |
| 2,040,248 | 5/1936 | Dvorak et al. | 400/486 X |
| 2,053,874 | 9/1936 | O'Donnell | 434/227 |
| 2,318,519 | 5/1943 | Palanque | 400/488 X |
| 3,732,965 | 5/1973 | Mero | 400/682 |
| 4,378,553 | 3/1983 | McCall | 400/477 X |
| 4,467,150 | 8/1984 | Leitermann et al. | 400/488 X |

FOREIGN PATENT DOCUMENTS

| | | | |
|---|---|---|---|
| 552611 | 6/1932 | Fed. Rep. of Germany | 400/489 |
| 577708 | 6/1933 | Fed. Rep. of Germany | 400/489 |
| 2218065 | 10/1973 | Fed. Rep. of Germany | 400/489 |
| 2725677 | 6/1977 | Fed. Rep. of Germany | 400/486 |
| 2607126 | 8/1977 | Fed. Rep. of Germany | 400/489 |
| 1015177 | 8/1952 | France | 400/486 |
| 174678 | 4/1935 | Switzerland | 400/486 |
| 332476 | 7/1930 | United Kingdom | 400/489 |
| 1016993 | 1/1966 | United Kingdom | 400/488 |
| 2041295 | 9/1980 | United Kingdom | 400/486 |
| 2055701 | 3/1981 | United Kingdom | 400/472 |

OTHER PUBLICATIONS

"Editorial", Chris Morgan, Byte, The Small Systems Journal, vol. 7, No. 4, Apr. 1982, Published by McGraw-Hill, 5 pp.

Primary Examiner—Ernest T. Wright, Jr.

[57] ABSTRACT

An improved keyboard for computer terminals, computer input devices, word processors, typewriters and any other operating or simulator keyboard is disclosed in which selected keys of the keyboard are selectively positioned and aligned to enable a proper alignment of the left forearm and left hand from elbow to fingertips for the keys that are operated by the left hand, and to enable fast, accurate, unobstructed and comfortable movement of the fingers of the left hand; and in which selected keys of the keyboard are selectively positioned and aligned to enable a proper alignment of the right forearm and right hand from elbow to fingertips for the keys that are operated by the right hand and to enable fast, accurate, unobstructed and comfortable movement of the fingers of the right hand. The improved keyboard also provides a tactile and visual means for placing the hands in proper positions on the keyboard. The improved keyboard also provides a tactile and visual means for placing the keyboard in proper position in relation to the mid-line of the operator's body. Keyboarding by an experienced operator is made faster, more efficient, more accurate and more comfortable. The invention facilitates teaching, learning, and operating keyboards, especially the Alpha-Numeric keyboard. The invention also provides a method for improving keyboarding operations.

7 Claims, 2 Drawing Figures

BIO-MECHANICAL KEYBOARD STRUCTURE AND METHOD

BACKGROUND OF THE INVENTION

This invention relates to keyboards for computers, including terminals and input devices, word processing equipment, typewriters, and similar equipment, and simulators of such equipment, and methods of operating these keyboards, and to teaching and learning how to operate these keyboards.

The keyboards currently in use for computers, word processors, typewriters and similar equipment have a standard Alpha-Numeric Core of forty keys in four transverse rows of ten keys each. There are usually three rows of Alphabet and punctuation keys with one row of Number keys above the Alphabet keys. Additional keys surround this Alpha-Numeric Core in less standardized arrangements.

For a keyboard to be operated with speed, accuracy, efficiency and comfort, and for the teaching and learning of how to operate a keyboard to be accomplished quickly, efficiently and economically, the structure of the Alpha-Numeric Core should be bio-mechanically compatible with the human body, and the structure of the Alpha-Numeric Core should also facilitate hand placement, finger movement, and keyboard placement.

The existing structure of the Alpha-Numeric Core and the anatomical structure of the left hand and left arm are bio-mechanically incompatible for fast, accurate and comfortable operation by the left hand. The results of this bio-mechanical incompatibility are: movements of the fingers of the left hand are impaired, obstructed, slowed and misdirected; unnecessary movements are imposed on the left fingers, left hand, left wrist, left elbow and left arm; unnecessary musculo-skeletal physical and mechanical stress are imposed on the left fingers, left hand, left wrist, left arm, left elbow, the neck, shoulders and back; errors in striking the keys occur; and fatigue is caused.

The existing structure of the Alpha-Numeric Core does not facilitate accurate hand placement; it actually causes hand misplacement, even by experienced typists and keyboard operators. The results of hand misplacement include operating errors, inefficiency and loss of effective operating time.

The existing structure does not facilitate accurate placement of the keyboard in relation to the operator's body; it actually causes misplacement, even by experienced typists and keyboard operators. The results of misplacement include errors and improper bio-mechanical alignment.

The existing structure does not facilitate teaching or learning how to operate the keyboard; it actually presents substantial teaching and learning problems. The results of these problems include prolonged learning time, confusion, discouragement and increased cost.

The structure of the Alpha-Numeric Core on existing keyboards is:

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | ; |
| Z | X | C | V | B | N | M | , | . | ? |

In this standard Alpha-Numeric Core, the entire top row of letters Q W E R T Y U I O P is offset to the right below the number row; the entire middle row of letters A S D F G H J K L ; is offset to the right below the top row of letters; and the entire bottom row of letters Z X C V B N M , . ? offset to the right below the middle row of letters.

In two handed touch typing, the keys operated by the Left Hand are:

| 1 | 2 | 3 | 4 | 5 |
|---|---|---|---|---|
| Q | W | E | R | T |
| A | S | D | F | G |
| Z | X | C | V | B | the keys operated by the Right Hand are:

| 6 | 7 | 8 | 9 | 0 |
|---|---|---|---|---|
| Y | U | I | O | P |
| H | J | K | L | ; |
| N | M | . | . | ? |

To operate keyboard with both hands by touch, the fingers of the hands are placed on specific keys in the Middle Row of letters. The fingers of the Left Hand are placed on A S D F and the fingers of the Right Hand are placed on J K L ; and the fingers move from these eight keys to operate the other keys in the Alpha-Numeric Core.

The fingers that operate each of the keys in the Core are:

| Left Hand | | | | Right Hand | | | |
|---|---|---|---|---|---|---|---|
| Little Finger | Third Finger | Middle Finger | Index Finger | Index Finger | Middle Finger | Third Finger | Little Finger |
| 1 | 2 | 3 | 4 5 | 6 7 | 8 | 9 | 0 |
| Q | W | E | R T | Y U | I | O | P |
| A | S | D | F G | H J | K | L | ; |
| Z | X | C | V B | N M | , | . | ? |

The operation of the R and 4 keys will be used to illustrate how the structure of the Alpha-Numeric Core is bio-mechanically improper for the left hand. F, R and 4 are all operated by the left index finger. The left index finger is placed on the F key. To operate R and 4, the left index finger must extend upward and to the left of F. In doing this upward left extension, the left index finger must also clear the middle finger which is on D. To operate the R and 4 keys without moving the other fingers of the left hand from their positions on A S D, and without the Index finger bumping into the Middle finger or hurdling over it, the left wrist must bend in a counter-clockwise lateral manner to enable the Index finger to clear the Middle finger. This counter-clockwise movement is known as Left Wrist Deviation. When this movement is done, there is also movement of the left forearm and elbow.

This misalignment of the fingers, this counter-clockwise bend in the left wrist, and this movement of the left forearm cause musculo-skeletal physical and bio-mechanical stress on the fingers, hands, wrists, arms, neck, shoulders and back; errors in striking the keys; and fatigue.

Similar finger movement problems and finger/wrist/arm misalignment problems are involved in operating all of the keys operated by the left hand.

Therefore, a need exists for a keyboard that enables the keyboard operator to operate the Alpha-Numeric Core of the keyboard with both hands, both wrists, both arms, and both elbows in proper bio-mechanical alignment from each elbow to the fingertips of each hand, and that facilitates accurate placement of the hands on the proper keys of the Alpha-Numeric Core of the keyboard, and facilitates balanced placement of Alpha-Numeric Core of the keyboard in relation to the mid-line of the operator's body, and that facilitates teaching and learning how to operate the keyboard.

BRIEF SUMMARY OF THE INVENTION AND ITS OBJECTS

The objects of this invention are to provide an improved keyboard on which the keys in the Alpha-Numeric Core of the keyboard are operated with proper bio-mechanical alignment from the left elbow to the fingertips of the left hand and with proper bio-mechanical alignment from the right elbow to the fingertips of the right hand; that facilitates placement of the hands on the keyboard in proper position; that facilitates proper placement of the keyboard in relation to the mid-line of the body; and that facilitates teaching and learning how to operate the keyboard.

In this invention, the structure of the columns in the Alpha-Numeric Core that are to be operated by the fingers of the left hand is bio-mechanically compatible for operation by the left hand. The center of the Alpha-Numeric Core provides visual and tactile aids that facilitate placement of the fingers on the proper keys and alignment of the keyboard with the mid-line of the operator's body. The keys that are operated by the left hand are distinguished from the keys that are operated by the right hand, and the columns of keys indicate direction of finger movement.

DETAILED DESCRIPTION OF PREFERRED EMBODIMENT

In the following description, the term "keyboard" includes but is not limited to keyboards for computers including terminals and input devices, word processing equipment, typewriters and similar equipment and also to simulators of such operating equipment.

The invention will be described and illustrated by reference to the Alpha-Numeric Core for such a keyboard having the sequence of the letters known as the QWERTY arrangement. But it is not intended that the invention be so limited. The invention can similarly be applied to any keyboard and to any sequence of letters such as the DVORAK arrangement, and to any other arrangement of letters, numbers, characters, or any combination of letters, numbers and characters, and to keyboards used on other equipment.

Figure 1:
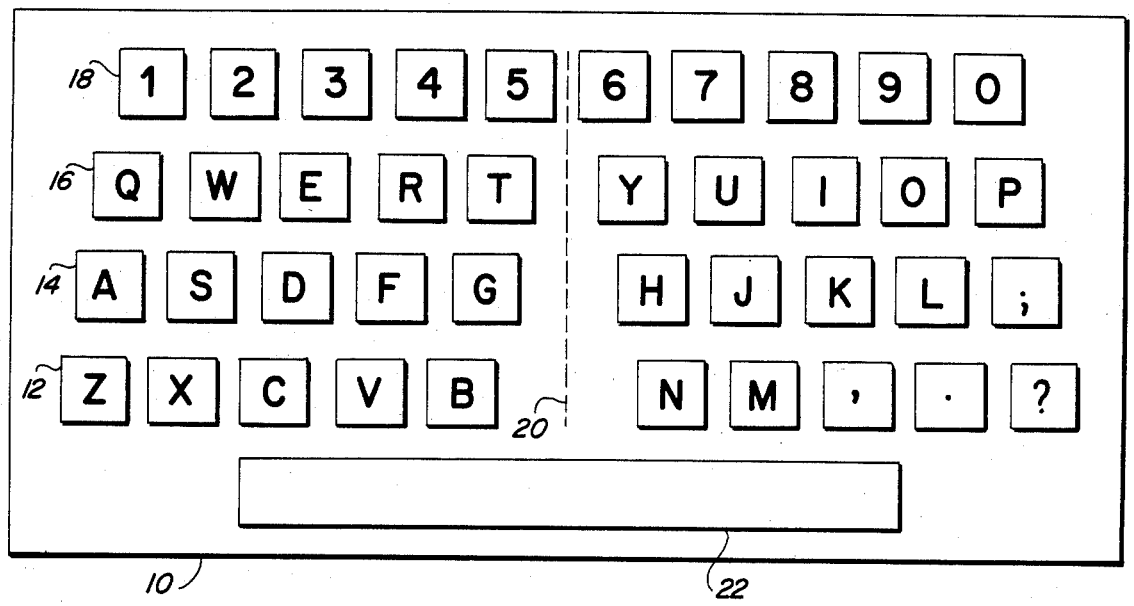
FIG. 1 illustrates the improved Alpha-Numeric Core as applied to a QWERTY key sequence.

FIG. 1 illustrates the preferred embodiment for the Qwerty Alpha-Numeric Core keyboard 10. In this embodiment, keyboard 10 includes four rows of keys with ten keys in each row. Three rows 12, 14, 16 have all of the letter keys and several punctuation marks; and one row 18 has the number keys.

At least one additional key such as 22, may be located outside said Core structure.

Figure 2:
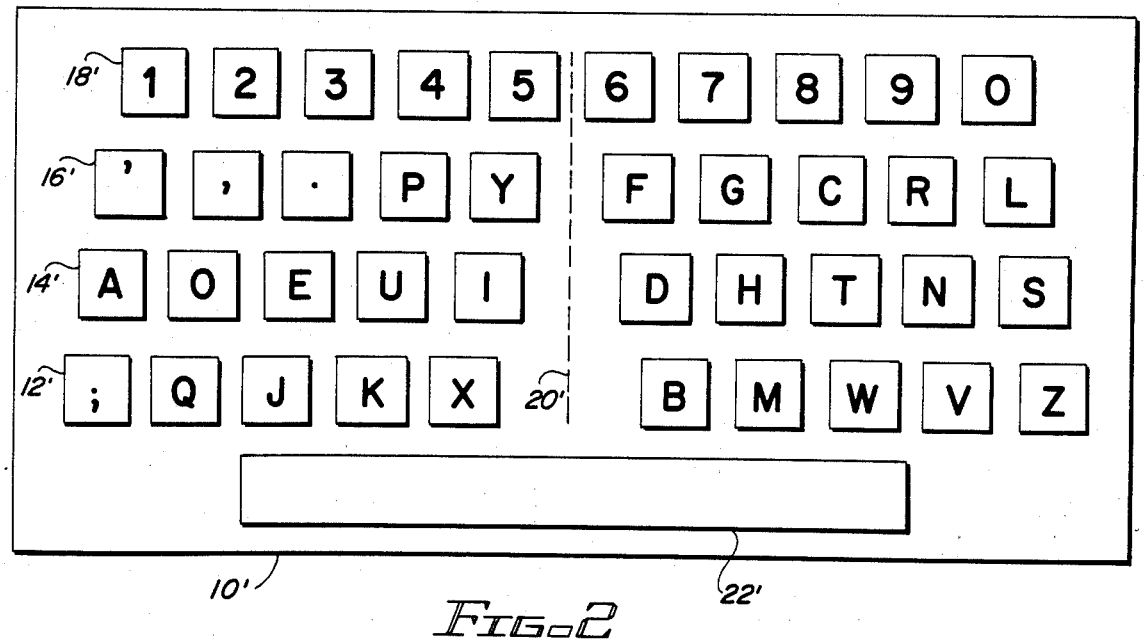
FIG. 2 illustrates the improved Alpha-Numeric Core as applied to a DVORAK key sequence.

FIG. 2 illustrates the preferred embodiment with the keys arranged in the Alternate Standard or Dvorak arrangement. The elements in FIG. 2 which are similar to the elements shown in FIG. 1 are identified by the same reference numerals modified by a prime added thereto.

The keyboard is divided into two sectors. The keys to the left of line 20 are operated by the left hand, and the keys to the right of line 20 are operated by the right hand.

The columns of keys in the sector operated by the left hand are structured on a diagonal to provide the proper alignment from left elbow to left fingertips, and the columns of keys in the sector operated by the right hand are structured on a diagonal to provide proper alignment from right elbow to right fingertips. The angle of the Left Hand Columns in relation to the transverse rows is equal and opposite to the angle of the Right Hand Columns in relation to the transverse rows.

In the number row 18, the keys having the numbers 1 2 3 4 5 6 7 8 9 0 are adjacent, evenly, and normally spaced in a straight transverse row across the Alpha-Numeric Core. Number keys 1 2 3 4 5 are operated by the fingers of the left hand, and number keys 6 7 8 9 0 are operated by the fingers of the right hand.

In the top row of letters 16, the keys that are operated by the left hand Q W E R T are offset to the left in relation to the numbers operate by the fingers of the left hand, and the keys that are operated by the right hand Y U I O P are offset to the right in relation to the numbers operated by the fingers of the right hand.

In the middle row of letters 14, the keys that are operated by the left hand A S D F G are offset to the left in relation to the letters in the top row of letters 16 that are operated by the left hand, and the keys in the middle row of letters that are operated by the right hand H J K L ; are offset to the right in relation to the letters in the top row of letters 16 that are operated by the right hand.

In the bottom row of letters 12, the keys that are operated by the left hand Z X C V B are offset to the left in relation to the letters in the middle row of letters 14 that are operated by the left hand, and the keys in the bottom row of letters that are operated by the right hand N M , . ? are offset to the right in relation to the letters in the middle row of letters 14 that are operated by the right hand.

The fingers that operate each of the keys on this improved keyboard are:

| Left Hand | | | | Right Hand | | | |
|---|---|---|---|---|---|---|---|
| Little Finger | Third Finger | Middle Finger | Index Finger | Index Finger | Middle Finger | Third Finger | Little Finger |
| 1 | 2 | 3 | 4 5 | 6 7 | 8 | 9 | 0 |
| Q | W | E | R T | Y U | I | O | P |
| A | S | D | F G | H J | K | L | ; |
| Z | X | C | V B | N M | , | . | ? |

When the operator positions his/her left hand on this keyboard, there is proper bio-mechanical alignment from the left elbow to the fingertips of the left hand.

When the operator extends or flexes the fingers of the left hand on this keyboard, there is proper bio-mechanical alignment from the left elbow to the fingertips of the left hand, and the fingers of the left hand do not touch, hurdle over, or go under adjacent fingers.

F R and 4 are now aligned for operation by the Left Hand. F R and 4 are now directly aligned with the line beginning at the left elbow through the left forearm and through the Left Index Finger. R and 4 can be operated by extension of the Left Index Finger without bumping, touching or hurdling over the Middle Finger, and without the Left Wrist bending or deviating in a counterclockwise lateral manner. The same alignment holds for the other keys operated by each finger of the left hand.

The space between the keys operated by the left hand and the keys operated by the right hand is lower in height than the finger strike surfaces of the keys. This space and the height difference provide a tactile means facilitating the placement of the hands in their proper positions on the keyboard by the Left Thumb feeling the right side of the B key and the Right Thumb feeling the Left side of the N key.

The space between the keys operated by the left hand and the keys operated by the right hand also provides a visual means facilitating the placement of the hands in their proper positions on the keyboard.

The space between the Left Hand sector and the Right Hand sector facilitates learning key locations, which hand and which finger operate each key, and the direction of the columns facilitates learning the direction of finger movement.

Although the invention has been described and illustrated with reference to specific embodiments thereof, it is not intended that the invention be limited to these illustrative embodiments. Variations and modifications differing from the illustrative embodiments may be made without departing from the spirit of the invention. Accordingly, it is intended that all such variations and modifications that fall within the appended claims be included within the invention.

What is claimed is:

1. In a keyboard for computers, including terminals, input devices, word processing equipment, typewriters, and similar equipment, and simulators of such equipment, an improvement comprising:

a Core structure having a plurality of forty keys, all of said forty keys having substantially equal lengths and substantially equal widths, all of said forty keys having a finger strike surface which is the surface of the key that is touched or tapped by the fingertip to operate the key;

said forty keys being in four straight parallel transverse rows with ten keys in each transverse row;

as said four rows of ten keys each are viewed from the operating position, said rows are designated Nearest, Second Nearest, Third Nearest and Fourth Nearest, in sequence from the row nearest the operator to the row farthest from the operator;

as each row of ten keys is viewed from the operating position, the keys are designated First, Second, Third, Fourth, Fifth, Sixth, Seventh, Eighth, Ninth and Tenth in sequence from left to right;

in all of said four transverse rows, the First, Second, Third, Fourth, and Fifth Keys are spaced substantially evenly transversely, and the Sixth, Seventh, Eighth, Ninth, and Tenth Keys are spaced substantially evenly transversely;

in all of said four transverse rows, the spacing of the First, Second, Third, Fourth and Fifth keys is substantially equal to the spacing of the Sixth, Seventh, Eighth, Ninth and Tenth Keys;

in the Fourth Nearest row, all 10 keys are spaced substantially evenly transversely;

in the Third Nearest Row, the space between the Fifth and Sixth Keys is wider than the space between the Fifth and Sixth Keys in the Fourth Nearest Row;

in the Second Nearest Row, the space between the Fifth and Sixth Keys is wider than the space between the Fifth and Sixth Keys in the Third Nearest Row;

in the Nearest Row, the space between the Fifth and Sixth Keys is wider than the space between the Fifth and Sixth Keys in the Second Nearest Row;

whereby from the Fourth Nearest Row to the Nearest Row, the space between the Fifth and Sixth Keys in each row is progressively wider;

said forty keys also being arranged in ten columns with four keys in each column;

as said ten columns of four keys each are viewed from the operating position, said columns are designated First, Second, Third, Fourth, Fifth, Sixth, Seventh, Eighth, Ninth and Tenth in sequence from left to right;

said First Column comprises the four keys that are the First Key in each of said four rows, and the Second, Third, Fourth, Fifth, Sixth, Seventh, Eighth, Ninth and Tenth Columns respectively comprise the four keys that are the Second, Third, Fourth, Fifth, Sixth, Seventh, Eighth, Ninth and Tenth key in each of said four rows;

in the Fifth Column of keys, in succession from the Fourth Nearest Row to the Nearest Row, the Fifth key in each row is successively offset to the left, with the amount of each successive offset being substantially equivalent, so that the Fifth Column is diagonal to the transverse rows;

in the Sixth Column of keys, in succession from the Fourth Nearest Row to the Nearest Row, the Sixth key in each row is successively offset to the right, with the amount of each successive offset being substantially equivalent, so that the Sixth Column is diagonal to the transverse rows;

the angle of the Fifth Column of keys in relationship to the transverse rows is equal and opposite to the angle of the Sixth Column of keys in relationship to the transverse rows;

whereby said First, Second, Third, Fourth and Fifth columns of keys are parallel to each other and are operated by the fingers of the Left Hand; and said Sixth, Seventh, Eighth, Ninth and Tenth columns of keys are parallel to each other and are operated by the fingers of the Right Hand.

2. The keyboard core structure of claim 1 with at least one additinal key located outside said keyboard core structure.

3. The keyboard core structure of claim 1 with the surface of the space between the Fifth and Sixth Columns of keys being lower in elevation than the finger strike surfaces of the keys in said Fifth and Sixth columns of keys.

4. The keyboard core structure of claim 1 in which the transverse row of keys Fourth Nearest the operator are assigned the digits 1 2 3 4 5 6 7 8 9 and 0 in sequence from left to right.

5. The keyboard core structure of claim 1 with the keys in the transverse rows Third Nearest, Second Nearest and Nearest the operator being assigned the following characters in sequence from left to right:

Third Nearest Row: Q W E R T Y U I O and P
Second Nearest Row: A S D F G H J K L and ;

Nearest Row: Z X C V B N M , . and ?

which key arrangement is known as the Standard or Qwerty arrangement.

6. The keyboard core structure of claim 1 with the keys in the transverse rows Third Nearest, Second Nearest and Nearest the operator being assigned the following characters in sequence from left to right:

Third Nearest Row: ' , . P Y F G C R and L
Second Nearest Row: A O E U I D H T N and S
Nearest Row: ; Q J K X B M W V and Z which key arrangement is known as the Alternate Standard or Dvorak arrangement.

7. A method of operating keyboards having at least forty keys with the fingers of both hands by touch without looking at said keyboard to operate said forty keys, the method comprising the steps of:

providing a keyboard with a Core Structure arranged as shown in the drawing;

the operator positioning the keyboard in relation to his/her body or positioning his/her body in relation to the keyboard, so that the space between the Fifth and Sixth columns of keys in said Core Structure is in line with the mid-line of the operator's body, said positioning being done by visually aligning said space with the mid-line of the body or by tactilly aligning said space with the mid-line of the body;

the operator maintaining said alignment of said space between the Fifth and Sixth columns of keys in said Core Structure with the mid-line of the body during operation of the keyboard by visually or tactilly checking the location of said space in relation to the mid-line of the body from time to time and moving the keyboard or the body to restore alignment of said space between said Fifth and Sixth columns of keys with the mid-line of the operator's body;

designating an Operating Finger to operate each of said forty keys in said Core Structure, which Operating Finger designations are: Little Finger of the Left Hand for the First Key in each row, Third Finger of the Left Hand for the Second Key in each row, Middle Finger of the Left Hand for the Third Key in each row, Index Finger of the Left Hand for the Fourth and Fifth Key in each row, Index Finger of the Right Hand for the Sixth and Seventh Key in each row, Middle Finger of the Right Hand for the Eighth Key in each, row, Third Finger of the Right Hand for the Ninth Key in each row, Little Finger of the Right Hand for the Tenth Key in each row;

assigning an Operating Position or Home Position to the fingertip of the Little, Third, Middle, and Index finger of each hand, which Operating Position for each of said fingertips is on or over a specified key in the Second Nearest row, and when the keyboard is viewed from left to right by the operator the Operating Position for each fingertip is:

Little Finger of Left Hand on or over First Key, Third Finger of Left Hand on or over Second Key, Middle Finger of Left Hand on or over Third Key, Index Finger of Left Hand on or over Fourth Key, Index Finger of Right Hand on or over Seventh Key, Middle Finger of Right Hand on or over Eighth Key, Third Finger of Right Hand on or over Ninth Key, Little Finger of Right Hand on or over Tenth Key;

when the keyboard is being operated, each of said eight fingertips rests lightly on or over its Operating Position and operates the keys for which it is the designated Operating Finger by moving the fingertip from its Operating Position to the key to be operated, and after having operated said key, returning the fingertip of the Operating Finger to its Operating Position;

the operator positioning the fingertips of his/her Little, Third Middle and Index fingers of his/her Left Hand in said Operating Positions on or over the First, Second, Third and Fourth keys in the Second Nearest Row of said Core Structure by using the Left Thumb to tactilly sense the right side of the Fifth Key in the Nearest Row of said Core Structure, and the operator maintaining the fingertips of said four fingers of the Left Hand on or over said four keys in said Second Nearest Row, by using the Left Thumb to tactilly sense the right side of said Fifth key in said Nearest Row from time to time during operation of the keyboard and repositioning the fingertips of said four fingers of the Left Hand on or over said First, Second, Third, and Fourth keys in said Second Nearest Row of said Core Structure;

the operator positioning the fingertips of the Little, Third, Middle and Index fingers of the Right Hand in said Operating Positions on or over the Tenth, Ninth, Eighth, and Seventh keys in the Second Nearest Row of said Core Structure by using the Right Thumb to tactilly sense the left side of the Sixth key in the Nearest Row of said Core Structure, and the operator maintaining the fingertips of said four fingers of the Right Hand on or over said four keys in said Second Nearest Row, by using the Right Thumb to tactilly sense the left side of said Sixth key in said Nearest Row from time to time during operation of the keyboard and repositioning the fingertips of said four fingers of the Right Hand on or over said Tenth, Ninth, Eighth and Seventh keys in said Second Nearest Row of said Core Structure;

the operator operating the First, Second, Third, Fourth, Seventh, Eighth, Ninth, and Tenth keys of the Second Nearest Row by tapping the finger strike surface of each of said eight keys with the fingertip of the Operating Finger for the key to be operated;

the operator operating the ten keys of the Third Nearest and Fourth Nearest Rows by extending the Operating Finger for the key to be operated from the Operating Position for that Operating Finger to the key to be operated and tapping the finger strike surface of the key to be operated with the fingertip of the Operating Finger, and then returning the fingertip of the Operating Finger to its Operating Position;

the operator operating the ten keys of the Nearest Row by flexing or curling the Operating Finger for the key to be operated from the Operating Position for that Operating Finger in the Second Nearest Row to the key to be operated and tapping the finger strike surface of the key to be operated with the fingertip of the Operating Finger, and then returning said fingertip of said Operating Finger to its Operating Position in said Second Nearest Row;

the operator operating all keys in all rows of said Core Structure, without any Operating Finger physically contacting, brushing, rubbing, grazing, touching, hurdling over, going under or overlapping an adjacent finger, and without any other finger being moved, displaced, pulled, pushed, or raised from its Operating Position, and without lateral or rotation movement of either hand, and without wrist deviation movement of either wrist, and without rotational movement of either forearm, and without lateral movement of either elbow.

* * * * *